(12) United States Patent
Anantharaju (10) Patent No.: US 10,231,095 B2
(45) Date of Patent: Mar. 12, 2019

(54) MOBILE COMMUNITY DRIVEN HELP FOR SOFTWARE APPLICATIONS

(71) Applicant: CA, Inc., Islandia, NY (US)

(72) Inventor: Girish Anantharaju, San Jose, CA (US)

(73) Assignee: CA, Inc., New York, NY (US)

( * ) Notice: Subject to any disclaimer, the term of this patent is extended or adjusted under 35 U.S.C. 154(b) by 357 days.

(21) Appl. No.: 14/231,823

(22) Filed: Apr. 1, 2014

(65) Prior Publication Data

US 2015/0281918 A1 Oct. 1, 2015

(51) Int. Cl.
*G06F 15/16* (2006.01)
*H04W 4/12* (2009.01)
*H04L 12/58* (2006.01)

(52) U.S. Cl.
CPC ............... *H04W 4/12* (2013.01); *H04L 51/04* (2013.01); *H04L 51/14* (2013.01)

(58) Field of Classification Search
CPC ......... H04L 51/14; H04L 51/24; H04L 51/38; H04W 4/12

USPC .................. 709/206; 715/708, 705, 714, 234
See application file for complete search history.

(56) References Cited

U.S. PATENT DOCUMENTS

| 7,594,176 B1* | 9/2009 | English | G06F 9/4446 706/50 |
| 2006/0147015 A1* | 7/2006 | Baumeister | H04M 3/4931 379/210.02 |
| 2012/0042002 A1* | 2/2012 | Smith | G06F 9/4446 709/203 |
| 2012/0309424 A1* | 12/2012 | Xiao | H04W 4/22 455/456.3 |

* cited by examiner

*Primary Examiner* — Thuong Nguyen (57) ABSTRACT

Providing help information includes receiving a message, wherein contents of the message comprise a request for help information related to a user application executing on a separate computer; and forwarding a query to a help repository, the query based on the contents of the message. In response, receipt from the repository of an identification of a resource within the repository occurs that is relevant to the query. Ultimately a notification message is sent to a mobile device associated with a user that is utilizing the user application, wherein contents of the notification message comprise data related to the identification of the resource.

17 Claims, 4 Drawing Sheets

MOBILE COMMUNITY DRIVEN HELP FOR SOFTWARE APPLICATIONS

BACKGROUND

The present disclosure relates to context-sensitive help, and more specifically, to providing such help in a community-driven manner.

Users of software applications often encounter difficulty in utilizing some or many aspects of those software applications. For example, errors and other instances can occur in which a user needs assistance before knowing how to continue using a software application. For applications running on platforms that are unconnected to a network, available help information is limited such as being limited to locally-located help resources. In some instances, however, a user could use a browser on a mobile phone to access the Internet wirelessly in order to browse websites related to using the software application.

Some software applications may have built in help information or robust error messages but, in many instances, a user may still be confused or uncertain how to proceed in using a software application. Thus, community-driven help forums have been developed that contain additional help-related information that be beneficial in certain circumstances. However, accessing a community-driven help forum to locate relevant help information relies on a user's ability to identify pertinent context-sensitive information and accurately describe any error or problems while minimizing extraneous, unrelated information.

BRIEF SUMMARY

According to one aspect of the present disclosure, a computer-implemented method for providing help information includes receiving a message, wherein contents of the message comprise a request for help information related to a user application executing on a separate computer; and forwarding a query to a help repository, the query based on the contents of the message. The method also includes receiving from the repository an identification of a resource within the repository relevant to the query; and sending a notification message to a mobile device associated with a user that is utilizing the user application, wherein contents of the notification message comprise data related to the identification of the resource.

According to another aspect of the present disclosure, a system for providing help information includes a computer processor and a memory in communication with the computer processor storing instructions. The instructions, when executed by the computer processor, implement a first receiver receiving a message, wherein contents of the message comprise a request for help information related to a user application on a separate computer processor; and a forwarding module sending a query to a help repository, the query based on the contents of the message. When executed, the instructions also implement a second receiver receiving from the repository an identification of a resource within the repository relevant to the query; and a transmitter sending a notification message to a mobile device associated with a user that is utilizing the user application, wherein contents of the notification message comprise data related to the identification of the resource.

According to another aspect of the present disclosure, a computer program product for providing help information, comprises a computer readable storage medium having computer readable program code embodied therewith. The computer readable program code includes computer readable program code for receiving a message, wherein contents of the message comprise a request for help information related to a user application executing on a remotely-located computer; and computer readable program code for forwarding a query to a help repository, the query based on the contents of the message. Also included is computer readable program code for receiving from the repository an identification of a resource within the repository relevant to the query; and computer readable program code for sending a notification message to a mobile device associated with a user that is utilizing the user application, wherein contents of the notification message comprise data related to the identification of the resource.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
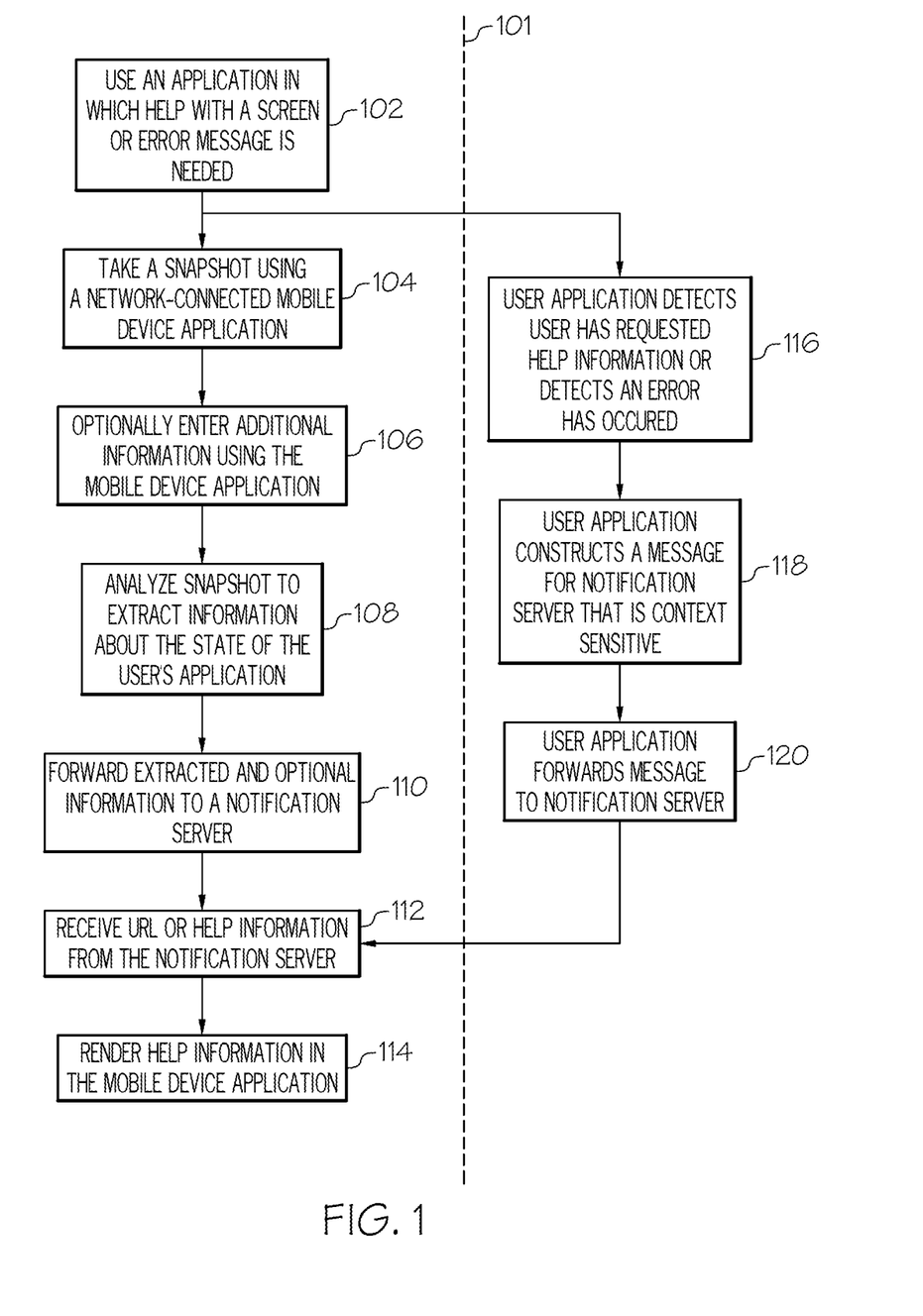
FIG. 1 illustrates a flowchart of an example method of obtaining context-sensitive help information in accordance with the principles of the present disclosure.

FIG. 1 illustrates a flowchart of an example method of obtaining context-sensitive help information in accordance with the principles of the present disclosure. Embodiments related to the present disclosure contemplate software applications that can be classified into two broad general categories. A first category includes those user applications that are or were designed without considering that a community-driven help system as described herein is available. A second category includes user applications that are or were specifically designed to take advantage of the community-driven help system as described herein. Many of the steps shown in FIG. 1 apply to both categories of software applications but some of the steps are more relevant for one category as compared to the other. The dashed line 101 in FIG. 1 provides a separator so as to more clearly delineate the steps to the right of that line 101 which are more related to software applications that, as part of their design, take advantage of the community-driven help system as described herein.

A user of a software application can sometimes encounter an input screen in which that user may need help in understanding what data input is being sought by the application. Similarly, sometimes an output screen is encountered in which the user needs help in deciphering the displayed output. The user's software application can, at other times, generate an error message, an error code or some other type of diagnostic-related message. Thus, in step 102, a user of a software application can encounter a screen or other situation (i.e., context) in which help with the application would be beneficial. In particular, context-sensitive help about the specific situation being encountered would be beneficial as compared to simply general information about the software application and its features. The software application is referred to as the "user application" in the description below to distinguish it from other software applications that are providing different functionality.

The user application may have built-in help functionality or it may not. The user application may be a network-aware application or it may be an offline application. Regardless of the different avenues that are available for locating context-sensitive help information for the user application, additional help information can be provided in accordance with the principles of the flowchart of FIG. 1.

Steps 104-110 are more relevant for user applications that were not designed to take advantage of the community-driven help system as described herein. However, these steps can also apply to those user applications that were designed to take advantage of the present system. In step 104, the user that is interacting with the user application captures an image of the current screen of the user application utilizing a mobile device. For example, a mobile phone, a tablet, or a laptop of the user that includes a camera can be used to capture the image of the user application's screen. In particular, the mobile device may include an app that connects with the camera to capture the screen image when the user commands the app to do so.

Step 106 is an optional step in which the user may be prompted to enter additional information to accompany the screen snapshot. For example, the user could enter additional identifying information about the context of the user application that could augment the information included in the snapshot. Information about operating systems, hardware platforms, network configuration, user privileges, application version numbers, etc. could optionally be entered by the user in step 106.

In step 108, image analysis is performed by the mobile device app to extract information about the state of the user application based on the captured screen snapshot. For example, some error messages include banners of specific colors that may be helpful in analyzing the snapshot. Some applications can be uniquely identified based on the combination of colors used in their display screens. Also, optical character recognition (OCR) can be performed to extract letters, words, and phrases (e.g., textual information) that may be present in the snapshot. The OCR and other image analysis steps extract information from the snapshot that is helpful in identifying the user application, the current context of the user application, and any error screens or other screens specifically encountered within the present context. As described later with respect to FIG. 3, the image analysis function may also be performed by a separate computing entity that receives a copy of the snapshot from the mobile-device app.

In step 110, the mobile-device app forwards the extracted information and any optionally entered information to a notification server. The mobile-device may be coupled to the notification server through a cellular communications network or may be coupled to a Wi-Fi network that provides communication between the mobile device and the notification server. Regardless of the network connectivity type, the mobile device app utilizes the inherent communications capability of the mobile device to forward the information to the notification server in step 110.

In step 112, in response to sending the information to the notification server, the mobile device app receives one or more links from the notification server. The links may, for example, be Uniform Resource Identifiers (URIs) or Uniform Resource Locators (URLs) that point to online help-related resources available for the user to access via the mobile device. In particular, the help-related resources can be from a community-driven help system that the notification server is associated with.

Each of the URLs can be shortened as well by a URL shortening service such as, for example, TinyURL. In this manner, cumbersome URLs that might point to message threads or forum postings can be shortened to a size that is more adapted for use and display on a mobile device. In addition to sending URIs or URLs, the notification server could send the help-related information as a document or web page. However, sending URLs rather than the content pointed to by a URL, especially sending shortened URLs, beneficially limits network bandwidth consumed by the messages from the notification server to the mobile device.

In step 114, the mobile device app itself, or using helper apps, renders the help-related information on the mobile device screen for the user. Thus, using the mobile device, the user can benefit from real-time, online, context-sensitive help repository for the user application that is being executed on computer that is separate, or remotely located, from the repository.

As mentioned above, a user application may be designed to take advantage of the help-related notification server and, thereby, request help-related information without using a mobile device and screen snapshot. One of ordinary skill will recognize that error-checking, exception handling, or input-checking functions are common aspects of modern software design. When an error occurs, or improper input is received, a software application detects such a condition and generates an error message or instructional message that is displayed for the user. In addition to this conventional behavior, those error-handling routines can include logic that sends a message to the notification server. Thus, when a user application designed in this way encounters an error, a message can be generated that includes context-sensitive information related to the error. For example, specific error numbers and data that produced that error could be included in the context-sensitive information. Additionally, the user interface of the user application can include icons or other widgets that allow the user to expressly search for help. The user application can therefore be designed to capture such activity by the user and in additional to any local help information that may be available also construct an appropriate message to send to the notification server.

In step 116, a user application detects that the user has requested help information or that some type of error or exception has occurred with the user application. Accordingly, in step 118, the user application constructs a message for the notification server that includes information about the current context of the user application. Part of that context information can include an identity of the user which can be obtained, for example, by the user's login credentials on the system where the user application is executing. This identity information may also be linked to a mobile device identifier. Although not shown in FIG. 1, a step similar to step 106 may also occur along with step 118 to allow a user to optionally enter additional information to include in the message that will eventually be forwarded to the notification server. Thus, the user may, for example, enter a different mobile device identifier or enter additional context-related information that may be pertinent.

In step 120, the user application forwards the constructed message to the notification server. Based on the contents of the message, the notification server identifies relevant help information and sends that information to a mobile device associated with the user. The help information is received in step 112 and rendered on the mobile device in step 114.

Figure 2:
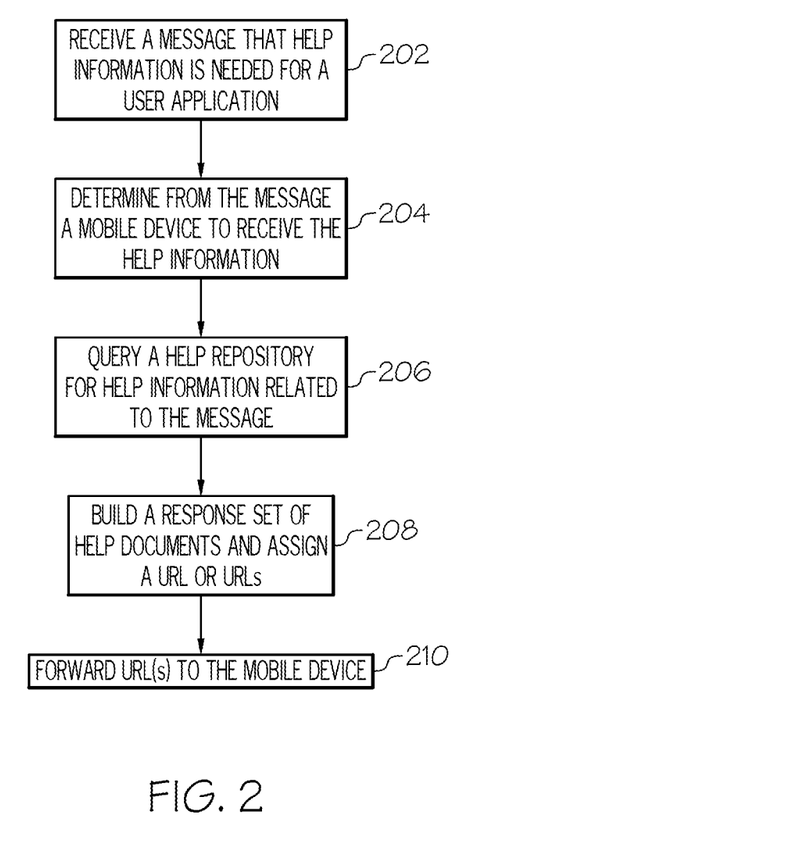
FIG. 2 illustrates a flowchart of an example method of providing context-sensitive help in accordance with the principles of the present disclosure.

FIG. 2 illustrates a flowchart of an example method of providing context-sensitive help in accordance with the principles of the present disclosure. The method in the flowchart of FIG. 2 is related to the method in FIG. 1 but is from a perspective of the notification server. Thus, in step 202, the notification server which is coupled to a network such as the Internet or an internal enterprise network receives a message requesting help information for a user application. The notification server, as part of analyzing that message, identifies in step 204 a mobile device that is to receive the requested information. Because the mobile device app and the notification server are designed to cooperate with one another, a predetermined message format allows information to be easily communicated between the two entities. For example, XML formatted messages having user-defined tags and related content allows for both the message sender and the message receiver to convey and extract information in a robust manner.

In step 206, the notification server autonomically generates a query to be used to search a repository of help information. The contents of the query are based on the message received from the user application or from the mobile device app. If the mobile device app sends merely a screen snapshot, then the notification server will perform OCR and other image analysis functions to extract context-related information from the snapshot. For example, colors present in the snapshot may be relevant, icons that are present, window title bars, window placement and other visual aspects of the snapshot may be relevant. In addition, OCR will allow the words and numbers in the screen snapshot to be determined. These words and numbers can, for example, be used as keywords in the query that the notification server generates. Other information extracted from the screen snapshot can be used to limit the query to only certain user applications, only certain hardware platforms, only certain operating systems, etc.

In some instances, the notification server may be part of an enterprise in which the number of potential user applications is limited in number. Thus, help requests related to only enterprise-approved applications and enterprise-approved versions of those applications may be received. The notification server may use this information as well in determining how to generate the query of the help repository.

The help repository may, for example, be a community-based or community-driven repository. An underlying assumption in a community-based help repository is that someone else has had the problem before and can help solve it. The contents of the repository can be referred to as a "knowledgebase" and can include Wiki pages, articles, frequently asked questions, transcripts of chat sessions, forums, and other information items related to issues deemed worthy of discussing by the community. The repository can, in some embodiments, be configured to search and retrieve relevant information items from third party site as well. Such a knowledge base receives a query that includes keywords or phrases and identifies, and ranks, individual resources in the repository (or third-party sites) that are relevant to that query.

In step 208, the notification server receives the results of the query of the help repository and can autonomically build a response notification message. The results may include the actual contents of the identified repository resources or may include URLs or URIs of the identified resources. Additionally, the notification server can, in step 208, shorten the URLs (e.g., using a service such as TinyURL) and then, in step 210, forward those URLs to the mobile device identified in step 204. In general, a URL can be communicated to a URL shortening service which creates a hash or similar identifier that associates a shortened URL with the original URL. A user that tries to access the shortened URL is then redirected to the contents located at the original URL.

Figure 3:
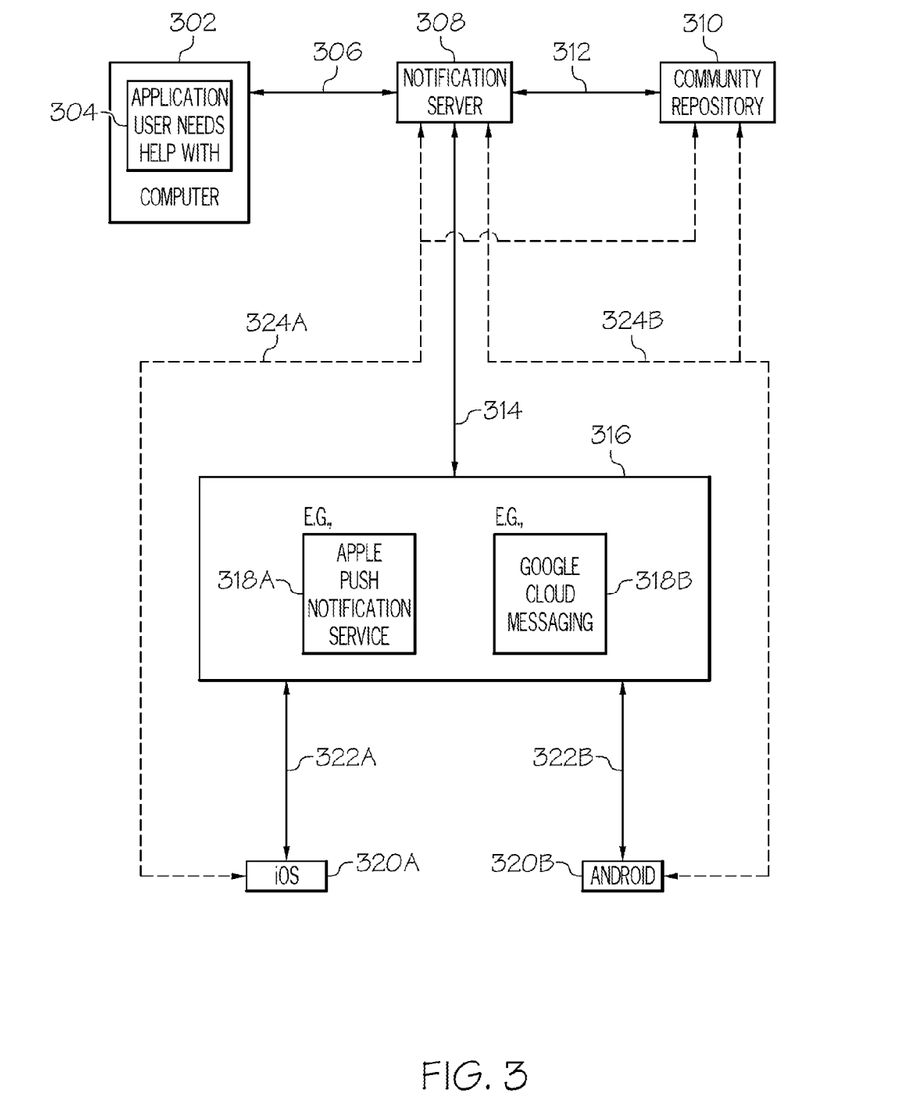
FIG. 3 depicts an example computing environment in which context-sensitive help can be obtained in accordance with the principles of the present disclosure.

FIG. 3 depicts an example computing environment in which context-sensitive help can be obtained in accordance with the principles of the present disclosure. A computer 302, which may be offline or network-connected, can be executing a user application 304 that may or may not include any help functionality. In some instances the user application 304 is designed to generate help-related requests that can be communicated to the notification server 308, such as over a network link 306. In other instances, a user can use a mobile device 320A, 320B to take a screen snapshot of the user application 304. An app on the mobile device 320A, 320B can then utilize the communications capabilities 324A, 324B of the mobile device 320A, 320B to convey that snapshot to the notification server 308.

As one example, the computer 302 on which the user application 304 is executing may crash or may "freeze" such that the user cannot use that computer 302 to search online, or local, help resources. However, the computer's display may still be in a state that has some information, even in this instance. Thus, the user can use a mobile device 320A, 320B to take a picture of the computer display if there is information there as described herein in accordance with the principles of the present disclosure.

As mentioned above, the mobile device app may include image analysis and OCR functionality in order to analyze the screen snapshot and extract context-relevant information about the user application 304. Thus, the mobile device 320A, 320B can forward the content-relevant information to the notification server 308 rather than the entire screen snapshot.

Regardless of how the help-related request is conveyed to the notification server 308, receipt of the request causes the notification server to query the community-driven help repository 310 for relevant help information. The notification server 308 and the community repository 310 may, for example, be coupled together through a network link 312 that allows them to communicate with one another.

In response, the community repository 310 provides an identification of one or more resources within the repository that are related to the query from the notification server 308. The communication server 308 can then build a notification message that includes the identification of those resources and forward that message to a mobile device 320A, 320B. Identifier information for the mobile devices 320A, 320B may, for example, be included in the help request received by the notification server. The screen snapshot information sent over the links 324A, 324B can include an identifier of the mobile devices 320A, 320B or the help request messages generated by the user application 304 can include an identifier of one of the devices 320A, 320B. This identifier assists the notification server 308 in communicating back to the appropriate mobile device 320A, 320B.

In particular, a network platform which the mobile devices 320A, 320B utilize can include a notification mechanism 316 that allows messages to be pushed to the mobile devices 320A, 320B over links 322A, 322B. For example iOS devices can utilize Apple Push Notification Service 318A and Android-based devices can utilize Google Cloud Messaging 318B. More generally, the notification mechanism 316 can be utilized to push a message that alerts an app on the mobile device 320A, 320B that new data is available for that app to retrieve or process. Furthermore, the pushed message can itself be constructed to include some, if not all, of the new data. For example, the notification server 308 can send a message over the link 314 to the notification mechanism 316 associated with the mobile device 320A, 320B. This message is then pushed to a mobile device 320A, 320B using a communications link 322A, 322B being utilized by that mobile device. The message may have a payload that includes multiple tiny URLs that the mobile device app can access via network links 324A, 324B and render on the mobile device screen. Alternatively, the message can include a notification that data is available on the notification server 308 that pertains to a recent help request. The mobile device app can then communicate with notification server 308 over the network links 324A, 324B to retrieve the data which may be a plurality of shortened URLs or may be the contents of resources from the repository 310.

In the flowcharts of FIG. 1 and FIG. 2, as well as the computing environment of FIG. 3, different computing platforms are described as sending, receiving, or transmitting various messages and other information. Such steps can be performed by software modules that execute on a processor, by hardware circuitry (e.g., receivers, transmitters, etc.) configured to perform such functions, or through a combination of both as described with respect to FIG. 4, for example.

Figure 4:
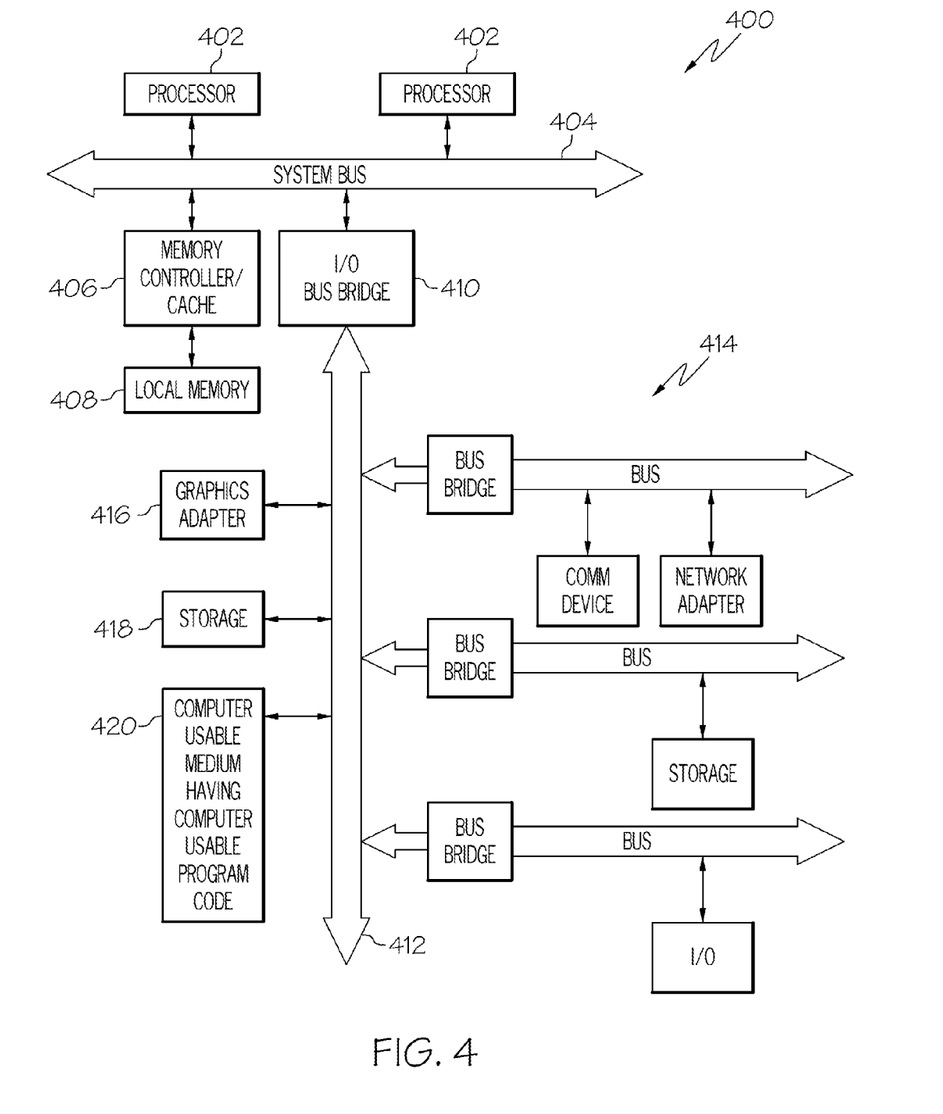
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 308 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer-implemented method for providing help information, comprising:
    receiving, by a computer, a message from a mobile device associated with a user utilizing a user application,
        wherein contents of the message comprise a request for help information related to a diagnostic-related message of the user application executing on a separate computer;
    forwarding, by the computer, an autonomically generated query to a help repository, the query based on the contents of the message;
    receiving, by the computer, from the repository an identification of a resource within the repository relevant to the query;
    sending, by the computer, a notification message to the mobile device associated with the user that is utilizing the user application,
        wherein contents of the notification message comprise data related to the identification of the resource and related to notifying the mobile device that relevant data is available on the computer that pertains to the request for help information related to the diagnostic-related message of the user application executing on the separate computer;
    receiving, by the computer from the mobile device, in response to the notification message, a request to retrieve the relevant data; and
    sending, by the computer to the mobile device, the relevant data.

2. The method of claim 1, wherein the contents of the message comprise an identifier of the mobile device.

3. The method of claim 1, wherein the contents of the message comprise a screenshot of the user application captured using the mobile device.

4. The method of claim 3, comprising:
    extracting, by the computer, textual information from the screenshot; and
    constructing, by the computer, the query using the textual information.

5. The method of claim 1, wherein the contents of the message comprise textual information extracted from a screenshot of the user application captured using the mobile device.

6. The method of claim 1, wherein the identification of a resource comprises a plurality of uniform resource locators.

7. The method of claim 6, wherein contents of the notification message comprise a respective shortened identifier for each of the plurality of uniform resource locators.

8. The method of claim 1, wherein the help repository comprises a community-driven help repository.

9. A system for providing help information, comprising:
    a computer processor;
    a memory in communication with the computer processor storing instructions that when executed by the computer processor cause the system to:
        receive a message from a mobile device associated with a user utilizing a user application,
            wherein contents of the message comprise a request for help information related to a diagnostic related message of the user application executing on a separate computer processor;

send an autonomically generated query to a help repository, the query based on the contents of the message;
receive from the repository an identification of a resource within the repository relevant to the query;
send a notification message to the mobile device associated with the user that is utilizing the user application,
wherein contents of the notification message comprise data related to the identification of the resource and related to notifying the mobile device that relevant data is available on the system that pertains to the request for help information related to the diagnostic-related message of the user application executing on the separate computer;
receive from the mobile device, in response to the notification message, a request to retrieve the relevant data; and
send to the mobile device, the relevant data.

10. The system of claim 9, wherein the contents of the message comprise an identifier of the mobile device.

11. The system of claim 9, wherein the contents of the message comprise a screenshot of the user application captured using the mobile device.

12. The system of claim 11, comprising:
an image analyzer for extracting textual information from the screenshot and
constructing the query using the textual information.

13. The system of claim 9, wherein the contents of the message comprise textual information extracted from a screenshot of the user application captured using the mobile device.

14. The system of claim 9, wherein the identification of a resource comprises a plurality of uniform resource locators.

15. The system of claim 14, wherein contents of the notification message comprise a respective shortened identifier for each of the plurality of uniform resource locators.

16. The system of claim 9, wherein the help repository comprises a community-driven help repository.

17. A computer program product for providing help information, comprising:
a non-transitory computer readable storage medium having computer readable program code embodied therewith, the computer readable program code comprising:
computer readable program code for receiving a message by a system from a mobile device associated with a user utilizing a user application,
wherein contents of the message comprise a request for help information related to a diagnostic-related message of the user application executing on a remotely-located computer;
computer readable program code for forwarding an autonomically generated query to a help repository, the query based on the contents of the message;
computer readable program code for receiving by the system from the repository an identification of a resource within the repository relevant to the query; and
computer readable program code for sending a notification message to the mobile device associated with the user that is utilizing the user application,
wherein contents of the notification message comprise data related to the identification of the resource and related to notifying the mobile device that relevant data is available on the system that pertains to the request for help information related to the diagnostic-related message of the user application executing on the separate computer;
computer readable program code for receiving from the mobile device, in response to the notification message, a request to retrieve the relevant data; and
computer readable program code for sending to the mobile device, the relevant data.

\* \* \* \* \*